United States Patent [19]

Doyle

[11] Patent Number: 5,749,953
[45] Date of Patent: May 12, 1998

[54] HIGH SHEAR ASPHALT COMPOSITIONS

[75] Inventor: Michael P. Doyle, Phoenix, Ariz.

[73] Assignee: Vinzoyl Technical Services, LLC, Tempe, Ariz.

[21] Appl. No.: 587,964

[22] Filed: Jan. 17, 1996

[51] Int. Cl.$^6$ .................. C08L 95/00; C09D 195/00
[52] U.S. Cl. ................................... 106/273.1
[58] Field of Search ............................ 106/273.1

[56] References Cited

U.S. PATENT DOCUMENTS

| | | |
|---|---|---|
| 4,874,432 | 10/1989 | Kriech et al. .................. 106/273.1 |
| 5,221,703 | 6/1993 | Ostermeyer ....................... 524/68 |

*Primary Examiner*—David Brunsman
*Attorney, Agent, or Firm*—Vinson & Elkins, L.L.P.

[57] ABSTRACT

A method to saponify the naturally-occurring acids found in asphalts is disclosed. The method utilizes sodium hydroxide (or other strong base), added to asphalt which is then subjected to high shear mixing, at an elevated temperature. The method disclosed may be used in conjunction with polymers and other modifiers added to asphalt to enhance the asphalt's performance. The asphalt prepared in accordance with the method is used in road applications, roofing applications and numerous specialty applications which use asphalt as the base material. The asphalt prepared in accordance with the method can be used hot, liquefied with solvents or emulsified with water and surfactants.

18 Claims, No Drawings

HIGH SHEAR ASPHALT COMPOSITIONS

FIELD OF THE INVENTION

This invention relates to asphalt compositions of the type utilized for roads, roofing, soil treatment and specialty applications as well as to processes for their preparation, characterized by the use of sodium hydroxide to saponify the naturally-occurring acids in such asphalts. The asphalt so modified may be used hot, liquefied with solvents or emulsified in water with surfactants.

BACKGROUND OF THE INVENTION

Asphalt (or bitumen) compositions are in widespread use as asphalt-aggregate blends for road applications, in roofing shingles, hot applied roofing systems, pipe coating, soil treatment and other related specialty applications. A problem with all applications that involve asphalt is the tendency for the asphalt to become brittle at low temperatures and to become soft at high temperatures. This change due to temperature is called "temperature susceptibility." Some asphalts, depending on crude oil source and refining practice are more temperature susceptible than others. Asphalt aging further aggravates this temperature susceptibility problem. Various additives, polymers, etc., have been utilized for the purpose of improving the high and low temperature characteristics of asphalt compositions, as well as to improve their toughness and durability. Additives such as styrene based polymers, polyethylene based polymers, polychloroprene, gilsonite, various oils, and many other modifiers including tall oil have been added to asphalt to enhance various engineering properties of asphalt. Tall oil has been added to asphalt to create a "gelled" asphalt by saponifying the rosin and fatty acids contained in the tall oil. Prior art methods to create "gelled asphalts" have required the addition of at least one rosin acid and one fatty acid in the form of tall oil prior to the addition of a strong base, usually sodium hydroxide.

U.S. Pat. No. 5,221,703 entitled "Engineered Modified Asphalt Cement" relates to a modified bituminous material containing asphalt, tall oil, a polymer (such as styrene butadiene, natural latex, etc.) and a strong base (preferably sodium hydroxide or potassium hydroxide). A small amount of water is present in the composition, either as water in a solution of the strong base, or water in a latex added as the polymer in the composition.

U.S. Pat. No. 4,874,432 entitled "Multi-grade Asphalt Cement Product and Process" relates to a process for producing a multi-grade asphalt cement product. The process involves saponifying in liquefied asphalt, substantially free of water, at least one fatty acid and at least one resin acid with an alkali metal base, or by adding the already saponified acid to the liquefied asphalt. The resulting gelled asphalt cement is utilized in conventional processes for road paving, roofing, and specialty applications. The preferred organic acid component for the process is tall oil and the preferred alkali metal base is anhydrous sodium hydroxide.

The present invention is unique in that a gelled asphalt is produced without the addition of rosin or fatty acid from an outside source, as in previous art. This is possible because all asphalts contain acids naturally. These acids will vary in concentration and type depending on the source of the asphalt, but the acids are there. Under controlled conditions, these acids can be saponified by the addition of sodium hydroxide, creating a gelled asphalt that possesses superior rheological properties over unmodified asphalt. The key to being able to saponify these acids contained within the asphalt is the application of high shear, for a controlled amount of time, while maintaining the asphalt/sodium hydroxide mixture within a specific temperature range.

The present invention further enhances the effectiveness of polymers such as styrene butadiene styrene (SBS), styrene butadiene rubber (SBR), ethylene vinyl acetate (EVA), gilsonite and others used to modify asphalt.

A particularly suitable polymer modifier for use according to the present invention is ELVALOY™ AM available from DuPont. ELVALOY™ AM is characterized by DuPont as a polymer modifier to extend asphalt pavement life and to provide improvements in asphalt compatibility, mix stability, handling characteristics and product performance. In addition, other polymers of the "ELVALOY™ FAMILY," that is, co-polymers containing glycidyl methacrylate or glycidyl acrylate as epoxy-bearing moieties, may also be used.

After the polymers are added to the asphalt, sodium hydroxide is added at the proper temperature and then high shear applied for a controlled time period. The resulting modified asphalt will have improved rheological properties over modified asphalts with polymer alone.

SUMMARY OF THE INVENTION

It is, accordingly, the primary object of the present invention to provide a method to saponify the acids that are contained in asphalts naturally, creating a modified asphalt with improved rheological properties. These acids, once saponified in this manner also enhance the response of other modifiers that may be used. Because of the high shear and temperatures being used, high percentages of sodium hydroxide may be added to fully saponify these naturally-occurring acids. This allows the asphalt to be modified to achieve extreme properties.

Another object is to provide asphalt compositions resulting from the saponification of the naturally-occurring acids which demonstrate improved high and low temperature performance characteristics, as well as improved adhesion and overall wear characteristics.

A further object is to modify asphalt that contains NaOH (or another strong base) as a result of caustic washing (NaOH in aqueous form) of crude oil to control acidity during the refining process. Asphalt produced as a by-product of such refining processes and containing caustic can be gelled by heating the asphalt to a specified temperature range and applying high shear, for a specified period of time, so as to saponify the acids naturally occurring in such asphalts. The resulting modified asphalt will have enhanced properties without the addition of external acid sources.

A further object is to provide such improved asphalt compositions which incorporate ELVALOY™ AM in conjunction with the saponification of the naturally-occurring acids. Such asphalts demonstrate enhanced rheological properties over modified asphalts which contain ELVALOY™ AM but without the naturally-occurring acids saponified.

A further object is to provide such improved asphalt compositions which incorporate various modifiers such as SBS, SBR, EVA, ELVALOY™ AM, gilsonite and others in conjunction with the saponification of the naturally-occurring acids that demonstrate enhanced rheological properties over modified asphalts which contain such polymers, but without the naturally-occurring acids being saponified as provided herein.

A further object is to provide such asphalt compositions which meet SHRP ("Strategic Highway Research Program")

specifications, without the use of expensive modifiers in high percentages in the compositions A further object is to modify the asphalt by saponifying the naturally-occurring acids in the asphalt, either with or without polymers added, and then emulsifying the modified asphalt with water and surfactants or liquefying with solvents.

As discussed more fully in the detailed disclosure below, these objects and advantages of the invention are accomplished by the saponification of the naturally-occurring acids in asphalt using only sodium hydroxide, or another strong base, the proper temperature, time and high shear, producing an improved asphalt for use in all asphalt based compositions. The resulting saponified acids within the asphalt appear to function to convert the asphalt compositions from those that follow Newtonian flow to non-Newtonian flow, thereby improving their high temperature and low temperature performance characteristics.

Asphalt compositions prepared by the disclosed method of saponifying the naturally-occurring acids within asphalt, also demonstrate superior performance in their ability to adhere to aggregate, to resist oxidative aging and to enhance the use of modifiers. No prior art method has done this without the addition of at least one rosin acid and one fatty acid from an outside source such as tall oil.

DETAILED DISCLOSURE

Asphalt as used herein refers to naturally-occurring asphalt (bitumen) as well as to manufactured asphalts produced by petroleum refining. All such asphalts are made up of carboids, carbenes, asphaltenes, asphaltic resins, oily constituents and asphaltic acids and their anhydrides. Such asphaltic acids, also referred to as naturally-occurring asphaltic acids, vary in percentage greatly from about 1 percent to as high as about 12 percent, but generally are in the range of about 4 to 6 percent, by weight, of the total asphalt. (All percentages in this specification and in the claims are weight percents.) These acids are in a complex form, bound up within the asphalt's structure.

The improved asphalt of the invention is prepared by saponifying these acids that are in all asphalts naturally with a strong base, preferably sodium hydroxide. The saponification is achieved by heating the asphalt to temperatures between 135° C. and 232° C. but more preferably between 190° C. and 218° C., with 204° C. believed to be close to optimum. Once at the desired temperature, anhydrous sodium hydroxide is added to the hot asphalt in amounts ranging from about 0.25 percent to 5 percent, but more preferably 0.75 percent to 2.25 percent, with the asphalt component comprising the balance. The sodium hydroxide and asphalt are mixed and passed through a high shear mill. One pass through the mill is the minimum with two passes being desired. Additional passes may be useful, depending on the desired finish properties of the modified asphalt. The gap of the shear mill is preferably set between 0.10 mm and 0.65 mm, with 0.30 mm being more preferred. Other settings may suffice, but more passes through the mill will be necessary for wider mill gap settings. The mixture will foam slightly as the reaction creates a small amount of water which leaves as vapor. Once this reaction occurs, the mixture is ready for testing. The resulting mixture is substantially acid free.

Prior art processes in which strong bases are added to asphalts have not succeeded in saponifying these naturally-occurring acids in the asphalts because ordinary mixing or blending steps do not produce a sufficiently intimate admixture, which is achieved in the present process by use of the shear mill. Accordingly, in prior art saponified tall oil/asphalt mixtures, substantial unreacted oils remained, bound up in the asphalt crystalline structures.

Other strong bases, such as potassium hydroxide, may be substituted for the sodium hydroxide if desired.

When preparing the asphalt, if polymers are to be added, the polymers preferably are added to the asphalt prior to the shear mixing step. The polymer/asphalt/base mixture is then handled in the above described manner and the saponification completed.

The NaOH may be added during the refining process resulting in asphalt containing NaOH. Some refinery processes require strict control of the acidity or caustic is used to absorb such things as mercapitanes during refining of crude oil. The crude oil is washed with an aqueous solution of caustic (or another strong base) or other refinery streams are washed with an aqueous solution of caustic (or another strong base). These refinery streams when refined, leave the caustic or other strong base in the heavier fractions of the distillation process which ultimately is asphalt. The amount of caustic left in the asphalt is sufficient to modify the asphalt when high shear is applied per the present invention.

It is not necessary that the saponification reaction neutralize all, or substantially all, of the acids naturally present in the asphalt, but only a material portion thereof, in order to produce the advantages of the invention. Asphalts which are more acidic achieve higher degrees of modification per the present invention than low acidic asphalts.

Experimental

To demonstrate the improvements of the present invention, a series of asphalt batches were prepared and tested, with and without saponification of the naturally-occurring acids.

Preparation Methods

In preparing the test batches referenced in Table I below, asphalt samples of the types referenced under "asphalt description" were blended with the amounts, if any, of sodium hydroxide and of SBR, SBS, EVA and ELVALOY™ AM polymer additives, as shown in the respective columns to produce test batches with the overall weight percentage compositions indicated. The test batches generally comprised a total weight of approximately 750 grams. In those cases where SBR, SBS, EVA or ELVALOY™ AM additives were included, they were blended with the raw asphalt, in the amounts indicated, by standard mixing procedures. Where sodium hydroxide was utilized, anhydrous sodium hydroxide pellets were next added to the asphalt and/or asphalt-additive mixtures and the resulting mixtures blended at "low" or "high" shear mixing at the temperatures and for the times indicated in Table I. "Low" shear refers to mixing the asphalt composition utilizing a typical "boat prop" type of mixer which results in relatively low shear between the components of the mixture being mixed. "High" shear as used in the specification and claims refers to mixing the asphalt composition using a Silversen L4R descending head shear mixer or other suitable high shear mixer with the mill gap set between about 0.10 millimeters and 0.65 millimeters. In the test samples discussed below, the mill gap was set at about 0.60 to 0.65 millimeters. Temperature and duration of the mixing step are as indicated in Table I. Mixing time allows for multiple passes through the high shear head. The gap width on the lab mixer used for the test batches is fairly large, requiring therefore more time. In all mixtures exposed to high shear mixing in the laboratory, with this rather wide gap setting, the mixture was passed through the shear mill many times during the 30 minute shear period. In pilot plant trials using a Seifer SMD3 300 HP high shear mixer with gap set at 0.30 mm, two to three passes were required to achieve the desired reaction between the NaOH and the asphaltic acids. The asphalt compositions, in all cases, were free of added acid sources and added water.

In the observed mixing of the anhydrous components at low shear, little or no foaming was observed indicating that little or no saponification of naturally-occurring acids in the asphalt by the anhydrous sodium hydroxide was occurring.

In all cases of mixing at high shear, some amount of foaming was observed, indicating the presence of a saponification reaction.

The compositions of the test batches, and their methods of preparation are shown in Table 1. Test results are shown in Tables 2, 3 and 4:

TABLE 1

COMPOSITIONS OF TEST BATCHES AND PREPARATION METHODS

| No. | Asphalt Description | % Asphalt | % Sodium Hydroxide | % SBR or % SBS | % ELVALOY™ or % EVA | Type of Mixing (shear) | Mixing Temp, Celsius | Mixing Time, Minutes |
|---|---|---|---|---|---|---|---|---|
| 1 | Cold Lake 120/150 A meeting ASTM D946-82 | 100.00 | 0 | 0 | 0 | | | |
| 2 | Cold Lake 200/300 A meeting ASTM D946-82 | 100.00 | 0 | 0 | 0 | | | |
| 3 | Cold Lake 300/400 A meeting ASTM D946-82 | 100.00 | 0 | 0 | 0 | | | |
| 4 | SJV AC-5 TABLE I meeting ASTM D3381-92 | 100.00 | 0 | 0 | 0 | | | |
| 5 | SJV AC-10 TABLE I meeting ASTM D3381-92 | 100.00 | 0 | 0 | 0 | | | |
| 6 | SJV AC-20 TABLE I meeting ASTM D3381-92 | 100.00 | 0 | 0 | 0 | | | |
| 7 | SJV AC-30 TABLE I meeting ASTM D3381-92 | 100.00 | 0 | 0 | 0 | | | |
| 8 | SJV AC-40 TABLE I meeting ASTM D3381-92 | 100.00 | 0 | 0 | 0 | | | |
| 9 | Venezuelan Bach AC-5 TABLE II meeting ASTM D3381-92 | 100.00 | 0 | 0 | 0 | | | |
| 10 | Venezuelan Bach AC-20 TABLE II meeting ASTM D3381-92 | 100.00 | 0 | 0 | 0 | | | |
| 11 | Cold Lake 200/300 A meeting ASTM D946-82 | 99.00 | 1.00 | 0 | 0 | low | 190 | 60 |
| 12 | Cold Lake 200/300 A meeting ASTM D946-82 | 98.00 | 2.00 | 0 | 0 | low | 190 | 60 |
| 13 | Cold Lake 200/300 A meeting ASTM D946-82 | 98.00 | 2.00 (SBR) | 0 | 0 | low | 218 | 60 |
| 14 | Cold Lake 200/300 A meeting ASTM D946-82 | 99.00 | 1.00 | 0 | 0 | high | 163 | 60 |
| 15 | Cold Lake 200/300 A meeting ASTM D946-82 | 99.00 | 1.00 | 0 | 0 | high | 190 | 30 |
| 16 | Cold Lake 200/300 A meeting ASTM D946-82 | 99.00 | 1.00 | 0 | 0 | high | 204 | 30 |
| 17 | Cold Lake 200/300 A meeting ASTM D946-82 | 98.00 | 2.00 | 0 | 0 | high | 190 | 30 |
| 18 | Cold Lake 200/300 A meeting ASTM D946-82 | 99.25 | .75 | 0 | 0 | high | 218 | 30 |
| 19 | Cold Lake 200/300 A meeting ASTM D946-82 | 99.25 | .75 | 0 | 0 | high | 232 | 30 |
| 20 | Cold Lake 200/300 A meeting ASTM D946-82 | 98.50 | 1.50 | 0 | 0 | high | 204 | 30 |
| 21 | Cold Lake | 98.00 | 2.00 | 0 | 0 | high | 190 | 15 |

TABLE 1-continued

COMPOSITIONS OF TEST BATCHES AND PREPARATION METHODS

| No. | Asphalt Description | % Asphalt | % Sodium Hydroxide | % SBR or % SBS | % ELVALOY ™ or % EVA | Type of Mixing (shear) | Mixing Temp, Celsius | Mixing Time, Minutes |
|---|---|---|---|---|---|---|---|---|
| 22 | Cold Lake 200/300 A meeting ASTM D946-82 | 98.50 | 0 | 1.50 (SBS) | 0 | high | 190 | 60 |
| 23 | Cold Lake 200/300 A meeting ASTM D946-82 | 98.00 | 0 | 2.00 (SBS) | 0 | high | 190 | 60 |
| 24 | Cold Lake 200/300 A meeting ASTM D946-82 | 98.50 | 1.50 | 0 | 0 | high | 190 | 30 |
| 25 | Cold Lake 200/300 A meeting ASTM D946-82 | 96.00 | 0 | 2.00 (SBR) | 2.00 (EVA) | high | 190 | 120 |
| 26 | Cold Lake 200/300 A meeting ASTM D946-82 | 95.60 | 1.00 | 2.00 (SBR) | 1.50 (EVA) | high | 190 | 120 |
| 27 | Cold Lake 200/300 A meeting ASTM D946-82 | 99.00 | 1.00 | 0 | 0 | high | 190 | 30 |
| 28 | Cold Lake 200/300 A meeting ASTM D946-82 | 98.00 | 2.00 | 0 | 0 | high | 190 | 30 |
| 29 | SJV AC-5 TABLE I meeting ASTM D3381-92 | 99.00 | 1.00 | 0 | 0 | high | 190 | 30 |
| 30 | SJV AC-10 TABLE I meeting ASTM D3381-92 | 99.00 | 1.00 | 0 | 0 | high | 190 | 30 |
| 31 | SJV AC-10 TABLE I meeting ASTM D3381-92 | 98.50 | 1.50 | 0 | 0 | high | 190 | 30 |
| 32 | SJV AC-10 TABLE I meeting ASTM D3381-92 | 98.00 | 2.00 | 0 | 0 | high | 190 | 30 |
| 33 | SJV AC-20 TABLE I meeting ASTM D3381-92 | 98.50 | 1.50 | 0 | 0 | high | 190 | 30 |
| 34 | SJV AC-30 TABLE I meeting ASTM D3381-92 | 98.50 | 1.50 | 0 | 0 | high | 190 | 30 |
| 35 | SJV AC-40 TABLE I meeting ASTM D3381-92 | 98.50 | 1.50 | 0 | 0 | high | 190 | 30 |
| 36 | Venezuelan Bach AC-5 TABLE II meeting ASTM D3381-92 | 98.50 | 1.50 | 0 | 0 | high | 190 | 30 |
| 37 | Venezuelan Bach AC-20 TABLE II meeting ASTM D3381-92 | 98.50 | 1.50 | 0 | 0 | high | 190 | 30 |
| 38 | Venezuelan Bach AC-20 TABLE II meeting ASTM D3381-92 | 97.00 | 0 | 3.00 (SBS) | 0 | high | 190 | 60 |
| 39 | Venezuelan Bach AC-20 TABLE II meeting ASTM D3381-92 | 96.50 | 0 | 3.50 (SBS) | 0 | high | 190 | 60 |
| 40 | Cold Lake 300/400 A meeting ASTM D946-82 | | 0 | 0 | 2 (ELVALOY) | high | 190 | 45 |
| 41 | Cold Lake 300/400 A meeting ASTM D946-82 | | 2 | 0 | | high | 190 | 30 |
| 42 | Cold Lake 300/400 A meeting ASTM D946-82 | | 2 | 0 | 2 (ELVALOY) | high | 190 | 45 |

Each of these products was subjected to one or more tests to determine properties related to asphalt performance. Tables 2 and 3 are results from tests which measure properties used to grade the asphalt by penetration, ASTM D946-82 or viscosity, ASTM D3381-92. These tests are empirical in nature, attempting to correlate to an asphalt's performance. Table 4 are results from tests used to grade asphalt based on the asphalt's rheometric properties. These tests are designed to relate directly to asphalt performance. These are new tests promulgated by the Strategic Highway Research Program (SHRP) and will be explained in the next section. The traditional tests are:

1. Viscosity (ASTM D4957) at 60° C. This test is used as an indicator of relative stiffness or hardness of an asphalt cement at a moderately high temperature to which a pavement might be expected to be subjected. Viscosities at 60° C. have been used to control tenderness and rutting of asphalt cement pavements. Viscosity at such temperature also frequently is used as a specification by purchasers.

2. Viscosity (ASTM D4957) at 135° C. This test is used as an indicator of the consistency of asphalt at temperatures associated with pumping, mixing and placement of asphalt cement pavements.

3. Penetration (ASTM D-5) at 4° C. This test is an indicator of relative stiffness or hardness of an asphalt cement at low temperature. Low temperature penetration has been specified to control low temperature thermal cracking.

4. Penetration (ASTM D-5) at 25° C. This test is an indicator of relative stiffness or hardness of an asphalt cement at moderate temperature. Penetration at 250° C. is also specified in ASTM specifications for asphalt cements by many purchasers. Penetration at 25° C. and viscosity at 135° C. is used to calculate the PVN (see #6 below).

5. Ductility (ASTM D-113) at 4° C. This test method provides one measure of tensile properties of bituminous materials at low temperatures. It also is used to measure ductility for some polymer-modified asphalt cement specification requirements.

6. Penetration-Viscosity Number (PVN). PVN was developed by McLeod as an indication of temperature susceptibility of asphalt. The PVN has become part of some asphalt specifications. By setting a minimum value for PVN, an attempt is made to control the temperature susceptibility of asphalt, especially excessive hardening of asphalt in the low temperature range. A more positive number means that the asphalt is less temperature susceptible.

7. Rolling Thin Film Oven Test (RTFOT), (ASTM D2872). This test method is intended to measure the effect of heat and air on a moving film of semi-solid asphaltic materials. A moving film of asphaltic material is heated in an oven for 75 minutes at 163° C. The sample is subjected to a continuous stream of air over the duration of the test. The effects of heat and air are determined from changes in physical test values as measured before and after the RTFOT treatment.

8. Viscosity Aging Index. The viscosity aging index is a ratio of the 60° C. viscosity of asphalt aged artificially by the "rolling thin film oven method ("RTFOT"), discussed below, to the original 60° C. viscosity for that asphalt, indicating the rate at which asphalt hardens. A lower number indicates that the asphalt will age slower and resist cracking for a longer period of time.

Table 2 presents the results of these tests on certain of the original (unaged) asphalt of compositions 1 through 42:

TABLE 2

| TEST RESULTS ON ORIGINAL UNAGED ASPHALTS | | | | | | |
|---|---|---|---|---|---|---|
| No. | VIS @ 60° C. ps | VIS @ 135° C. CST | PEN @ 4° C. DMM | PEN @ 25° C. DMM | DUCT @ 25° C. CM | PVN |
| 1 | 1,124 | 303 | 50 | 127 | 150 | −0.37 |
| 2 | 441 | 195 | | 251 | | −0.24 |
| 3 | 310 | 154 | 110 | 310 | | −0.39 |
| 4 | 550 | 155 | | 152 | 0 | −1.27 |
| 5 | 935 | 198 | | 88 | 0 | −1.43 |
| 6 | 1,754 | 261 | | 60 | 0 | −1.37 |
| 7 | 2,850 | 320 | | 42 | 0 | −1.40 |
| 8 | 3,560 | 361 | | 31 | 0 | −1.48 |
| 9 | 592 | 216 | | 185 | 100+ | −0.47 |
| 10 | 1,972 | 357 | | 79 | 100+ | −0.66 |
| 11 | 440 | | | | | |
| 12 | 620 | | | | | |
| 13 | 600 | | | | | |
| 14 | 1,870 | | | | | |
| 15 | 1,573 | 434 | | | | |
| 16 | 2,982 | 572 | | 90 | | 0.20 |
| 17 | 6,000 | | | | | |
| 18 | 2,200 | | | | | |
| 19 | 2,600 | | | | | |
| 20 | 2,100 | | | | | |
| 21 | 700 | | | | | |
| 23 | 2,382 | 735 | | | | |
| 29 | 2,847 | 637 | | | | |
| 30 | 6,944 | 806 | | | | |
| 36 | 1,987 | 440 | | | | |
| 37 | 6,559 | 733 | | | | |
| 40 | 1,542 | | | | | |
| 41 | 1,211 | | | | | |
| 42 | 5,560 | | | | | |

Table 3 presents the results of these tests on certain of the RTFOT aged asphalts of composition 1-37. RTFOT residues are prepared from unaged asphalts that are artificially in the "Rolling Thin Film Oven Test" (RTFOT described previously) which applies heat and air to a small amount of asphalt placed in a bottle that is rotating in the oven. This test simulates the aging that occurs due to the processing in the hot mix plant, thus simulating the viscosity the asphalt will be at the time of its application to a roadway.

TABLE 3

| TEST RESULTS ON RTFOT RESIDUES | | | | | |
|---|---|---|---|---|---|
| No. | VIS @ 60° C. PS | VIS @ 135° C. CST | PEN @ 4° C. DMM | PEN @ 25° C. DMM | VIS AGING INDEX |
| 1 | 3,383 | 454 | 27 | 67 | 3.1 |
| 2 | 1,014 | | | 125 | 2.3 |
| 3 | 982 | 277 | 62 | 146 | 3.1 |
| 4 | 1,150 | 225 | 25 | 90 | 2.1 |
| 5 | 2,021 | 298 | | 62 | 2.1 |
| 6 | 4,513 | 443 | | 35 | 2.5 |
| 7 | 7,130 | 520 | 9 | 28 | 2.5 |
| 8 | 8,480 | 535 | 8 | 21 | 2.4 |
| 9 | 1,120 | | | | 1.9 |
| 10 | 3,207 | | | | 1.6 |
| 15 | 3,199 | 667 | 50 | | 2.06 |
| 16 | 5,550 | 707 | 31 | | 1.9 |
| 23 | 6,814 | 1,115 | 42 | | 2.9 |
| 29 | 3,868 | 556 | 23 | | 1.3 |
| 30 | 12,030 | 947 | 14 | | 1.7 |
| 36 | 3,472 | 580 | 37 | | 1.7 |
| 37 | 13,757 | 1,110 | 18 | | 2.1 |

RESULTS

Mixing Methods

Combining NaOH with asphalt at various temperatures and NaOH concentrations using "Low Shear" indicated that little if any change occurred. Comparison of the untreated asphalt No. 2 to low shear batches 11, 12, 13 showed little increase to the 60° C. viscosity. Various temperatures were tried up to 218° C. Combining NaOH with asphalt at various temperatures using "High Shear" showed substantial increases in 60° C. viscosity. See examples 14–23. A substantial change also occurred to the PVN, No. 2 verses No. 16, indicating improved temperature susceptibility by the more positive number, −0.24 to +0.20. Various temperatures were examined within the range of manufacturing productivity. Temperatures below 190° C. showed less improvement. Temperatures above 218° C. showed that an optimum had been reached, defining a range of 190° C. to 218° C. Temperatures toward 218° C. allowed the NAOH to be decreased as compared to NaOH amounts at 190° C.

Asphalt Types

Refinery produced asphalts from three sources were tested. Cold Lake, a Canadian source; SJV, a California source; and a Venezuelan source. Trials No.14-28, 29-35 and 36-42 were tested to show improvements by the present invention and or comparisons to other modification methods versus the present invention. While only refinery-produced asphalts were tested, the results are believed equally applicable to naturally-occurring asphalts, such as Trinidad Lake Asphalt.

Physical Property Results

In all cases, the asphalts modified per the present invention showed improvements in performance characteristics at normal service temperature range (the 60° C. viscosity), high temperature service range (the 135° C. viscosity), and reduced aging, indicated by the aging index. Comparison of No. 2, the unmodified asphalt, to No.16 modified per the present invention, verses No. 22 and 23 modified with SBS shows the improvement to the asphalt by modification of the present invention verses modification with SBS at the two percentages tested. Comparison of No. 3, the unmodified asphalt, to No. 40, modified with ELVALOY™ AM or to No. 41, modified by the present invention and to No. 42, modified with both ELVALOY™ AM and per the present invention shows marked improvement.

SHRP Binder Testing

SHRP, the Strategic Highway Research Program, was created by the federal government to investigate new tests and specifications for asphalt that would correlate directly to pavement performance. Past methods relied on use of penetration or viscosity tests to predict the stiffness of the asphalt at various temperatures. These methods (called penetration grading or viscosity grading) were empirical and did not relate directly to pavement performance. SHRP is recommending that asphalts be specified by considering the climatic conditions and the loading conditions that the pavement will be subjected to. These specifications utilize measurements of the complex shear modulus (G*), which represents total applied stress (T total) and total strain (E total), along with the phase angle (delta), which characterizes the viscoelastic nature of the binder. Expected pavement performance is then represented by a combination of G*/sin delta, also known as 1/J", for minimum high temperature stiffness (to resist permanent deformation) and G* x sin delta, also known as G", for maximum intermediate temperature stiffness (to reduce fatigue cracking). Various SHRP performance grades (PG) have been established according to the criteria of the testing. SHRP created the following rheometric tests which evaluate the asphalt at various temperatures, aging conditions and loading conditions. User agencies are just beginning to specify SHRP graded asphalts. Very few suppliers can supply the grades at the extreme hot or cold ends of the grading scale.

The SHRP tests performed on the asphalt compositions of the present invention are:

1. Dynamic Shear Rheometer (ASTM P246). This test (abbreviated "DSR") utilizes a rheometer to measure the dynamic shear modulus, or stiffness, of an asphalt cement. The stiffness properties of asphalt binders at the upper range of service temperatures determine, in part, the rutting resistance the asphalt binder contributes to the hot mix asphalt (asphalt and aggregate). For this upper range of service temperatures, the asphalt is tested both unaged and aged (after RTFOT). G*/SIN delta is the resistance to permanent deformation. A value of 1.00 Kilo Pascal (KPA) on original unaged asphalt is set as a minimum. A value of 2.20 KPA for G*/SIN delta is set on the RTFOT residue as a minimum. At intermediate temperatures, the stiffness properties are related to fatigue resistance of hot mix asphalt. For the intermediate temperature, the asphalt is tested on the PAV residue (PAV is described below) and reported as G*SIN delta with a maximum value of 5.00 Mega Pascal (MPA). In Table 4, the DSR measurements for test samples are reported for "original DSR" referring to the unaged asphalt compositions, as "RTFOT DSR," referring to RTFOT samples of the asphalt compositions and as "PAV RESID DSR" referring to Pressure Aging Vessel samples of the compositions prepared the following method: The PAV (pressure aging vessel) residue is prepared by first subjecting the unaged asphalt to the aging of the RTFOT. The RTFOT residue is then placed on round trays and these trays are placed in the PAV vessel. The vessel is then pressurized to 2,100 kilopascals for 20 hours at a temperature of either 90° C., 100° C. or 110° C. depending on the climatic region. This residue represents the aging that the asphalt would receive after 8–10 years in the field. A detailed discussion of Dynamic Mechanical Testing is Published in "Interpretation of Dynamic Mechanical Test Data for Paving Grade Asphalt", *Journal of the Association of Asphalt Paving Technologists*, Volume 61, (1992) by D. W. Christensen and D. A. Anderson.

2. Bending beam rheometer (ASTM P245). This test, abbreviated "BBR" in Table 4, utilizes a bending beam rheometer to measure the low temperature stiffness characteristics of asphalt cements. A small beam of asphalt is tested at temperatures from 0° C. to −36° C. A 5"x¼"x½" beam of binder material is molded, cooled to testing temperature, and subjected to an imposed weight load. Load versus deflection data is collected for 240 seconds. The low temperature specification values are based on the stiffness value determined at 60 seconds and the absolute value of the slope (m-value) of the time vs. log (stiffness) curve determined at 60 seconds. The low temperature stiffness "s", the flexual stiffness, should be less than a maximum value of 300 MPA and the "m" value, the slope of the stiffness curve should be greater thus 0.30, to minimize the magnitude of the thermal shrinkage stresses developed during pavement cooling at a given pavement service temperature. Table 4 presents pressure aging vessel residual BBR measurements for each of the asphalt compositions investigated as both "S" units (MPA) at the indicated temperatures and as "M" at the indicated temperatures. A detailed discussion of Bending Beam Rheometric Testing is published in "The Bending Beam Rheometer: A Simple Device for Measuring Low Temperature Rheology of Asphalt Binders", *Journal of the*

*Association of Asphalt Paving Technologists*, Volume 61, (1992) by H. U. Bahia and D. A. Anderson.

3. SHRP Grade. Performance Graded Asphalt Binder Specification (ASTM P248). This number appearing in this column of Table 4 indicates the resulting SHRP grade, indicating the recommended temperature range this particular asphalt would be adequate for. The units are in degrees Celsius. For example, the SHRP grade of batch No. 5, PG 58–22 for AC-10 indicates that this asphalt is recommended for use in temperatures up to 58° C. and as low as –22° C. SHRP grades start at 4° C. on the high side and –46° C. on the low side. The grades then increment 6 from 46° C. to 82° C. on the high side and from 46° C. to –10° C. on the low side. A detailed discussion of the SHRP Binder Specifications is published in "Development of SHRP Binder Specification", *Journal of the Association of Asphalt Paving Technologists*, Volume 62, (1993) by D. A. Anderson and T. W. Kennedy.

4. DSR aging index. The DSR is run on asphalt unaged and after aging in the Rolling Thin Film Oven (RTFOT). The ratio of these two is the aging index occurs due to processing in the hot mix plant thereby simulating the asphalts properties at the time of placement on the roadway. As a pavement ages, the asphalt becomes brittle and cracking will occur. The lower the aging index is, the slower the asphalt ages thereby resisting low temperature cracking and fatigue cracking for a longer period of time.

5. Service temperature span. The SHRP test methods are all based on the measurements of stress and strain due to loading conditions (traffic) and temperature conditions (climate). Climate changes cause the asphalt to either be soft when hot or brittle when cold. An ideal asphalt would not get too soft nor too brittle in the climate where the asphalt is being used. If asphalt is highly temperature susceptible, (i.e., rheology changes with temperature changes) the asphalt will have a small service temperature span. This would restrict the climates in which that particular asphalt could be used and would restrict the asphalt to use in severe traffic conditions. An AC-10 with a SHRP grade of 58-22 has a temperature span of 58+22 or 80° C., batch no. 5. This same AC-10 when modified with NaOH per the present invention, batch No. 32, has a SHRP grade of 70-22 or a span of 92° C., an improvement of 12° C. or two SHRP grades. The 70-22 can be used in climates up 70° C. compared to the unmodified AC-10 which is restricted to a high temperature of 58° C. The greater the temperature span, the less temperature susceptible the asphalt. Asphalt cement pavement when made with the modified asphalt of the present invention will have a greater resistance to permanent deformation, fatigue cracking and low temperature cracking as compared to the unmodified asphalt.

Table 4 presents the SHRP data, resulting grade, DSR aging index and service temperature span for composition No.'s 1–39.

TABLE 4

SHRP BINDING TESTING

| No. | ORIGINAL DSR G°/SIN delta KPA @ DEGREES CELSIUS | RTFOT DSR G°/SIN delta KPA @ DEGREES CELSIUS | PAV RESID. DSR G°/SIN delta MPA @ DEGREES CELSIUS | PAV RESID. BBR S MPA @ DEGREES CELSIUS | PAV RESID. BBR M MPA @ DEGREES CELSIUS | SHRP GRADE | DSR AGING INDEX | SERVICE TEMP SPAN |
|---|---|---|---|---|---|---|---|---|
| 1 | 1.43 @ 58 | 3.42 @ 58 | 3.22 @ 19 | 173 @ –28 | 0.38 @ –18 | 58–28 | 2.39 | 86 |
| 2 | 1.41 @ 52 | 3.84 @ 52 | 3.68 @ 13 | 239 @ –24 | 0.35 @ –24 | 52–34 | 2.72 | 86 |
| 3 | 2.02 @ 46 | 5.70 @ 46 | 3.35 @ 10 | 202 @ –24 | 0.36 @ –24 | 46–34 | 2.82 | 80 |
| 5 | 1.34 @ 58 | 2.74 @ 58 | 3.48 @ 25 | 245 @ –12 | 0.33 @ –12 | 58–22 | 2.04 | 80 |
| 6 | 1.05 @ 64 | 2.32 @ 64 | 4.90 @ 25 | 142 @ –6 | 0.37 @ –6 | 64–16 | 2.21 | 80 |
| 7 | 1.68 @ 64 | 3.83 @ 44 | 4.56 @ 31 | 275 @ –6 | 0.32 @ –6 | 64–16 | 2.28 | 80 |
| 8 | 2.16 @ 64 | 4.49 @ 64 | 3.64 @ 34 | 149 @ 0 | 0.40 @ 0 | 64–10 | 2.08 | 74 |
| 9 | 1.40 @ 52 | 3.13 @ 52 | 2.82 @ 16 | 165 @ –18 | 0.40 @ 18 | 52–28 | 2.24 | 80 |
| 10 | 1.10 @ 64 | 2.36 @ 52 | 3.62 @ 16 | 173 @ –12 | 0.37 @ –12 | 64–22 | 2.15 | 86 |
| 22 | 1.92 @ 58 | 5.42 @ 58 | 3.76 @ 16 | 231 @ –24 | 0.30 @ –24 | 58–34 | 2.82 | 92 |
| 24 | 1.69 @ 64 | 3.59 @ 64 | 3.46 @ 13 | 208 @ –24 | 0.34 @ –24 | 64–34 | 2.12 | 98 |
| 25 | 0.31 @ 70 | 0.74 @ 70 | 0.73 @ 22 | 144 @ –24 | 0.32 @ –24 | 58–34 | 2.39 | 92 |
| 26 | 1.01 @ 76 | 2.50 @ 76 | 3.33 @ 10 | 264 @ –30 | 0.30 @ –30 | 76–40 | 2.48 | 116 |
| 30 | 2.03 @ 64 | 3.03 @ 64 | 4.24 @ 25 | 227 @ –12 | 0.33 @ –12 | 64–22 | 1.49 | 86 |
| 31 | 1.45 @ 64 | 2.74 @ 64 | 4.52 @ 22 | 160 @ –12 | 0.38 @ –12 | 64–22 | 1.89 | 86 |
| 32 | 1.43 @ 70 | 2.82 @ 70 | 2.23 @ 28 | 139 @ –12 | 0.31 @ –12 | 70–22 | 1.97 | 92 |
| 33 | 1.35 @ 70 | 2.82 @ 70 | 3.89 @ 28 | 241 @ –12 | 0.34 @ –12 | 70–22 | 2.09 | 92 |
| 34 | 1.97 @ 70 | 4.17 @ 70 | 3.67 @ 31 | 169 @ –6 | 0.38 @ –6 | 70–16 | 2.12 | 86 |
| 35 | 1.20 @ 76 | 2.46 @ 76 | 4.66 @ 31 | 208 @ –6 | 0.36 @ –6 | 76–16 | 2.05 | 92 |
| 36 | | | | | | 70–34 | | 104 |
| 37 | | | | | | 76–28 | | 104 |
| 38 | 1.63 @ 70 | 2.88 @ 70 | 2.50 @ 31 | 167 @ –6 | 0.31 @ –6 | 70–16 | 1.77 | 86 |
| 39 | 1.37 @ 76 | 2.77 @ 76 | 1.20 @ 37 | 108 @ –9 | 0.33 @ –0 | 76–10 | 2.02 | 86 |
| 40 | 1.49 @ 58 | 3.93 @ 58 | 3.53 @ 13 | 195 @ –24 | 0.33 @ –24 | 58–34 | 2.64 | 92 |
| 41 | 1.03 @ 70 | 2.94 @ 70 | 4.44 @ 10 | 175 @ –24 | 0.35 @ –24 | 70–34 | 2.85 | 104 |

HRP Results

Data in Table 4 demonstrate that asphalts modified by saponification of the naturally-occurring acids by the present invention provide excellent resistance to permanent deformation, increased fatigue resistance, reduced aging, increased resistance to low temperature cracking and increased use over a greater range of climatic regions. Comparison of unmodified asphalt No. 2, to run No. 24 shows that run No. 24 modified by present invention, has an increased SHRP grade, reduced DSR aging index and an increased service temperature span.

Comparison of unmodified asphalts No.'s 5 through 8 to run No.'s 30 through 35 modified by the present invention show that run No.'s 30 through 35 have increased SHRP grade, reduced DSR aging index and an increased service temperature span. Comparison of unmodified asphalts No.'s 9 and 10 to run No.'s 36 and 37 modified by the present invention, show that run No.'s 36 and 37 have increased SHRP grade reduced DSR aging index and an increased service temperature span.

Polymer modified asphalts also show improvement when saponified in accordance with the present invention. Compare run No. 25, without high shear mixing/saponification, to No. 26 with high shear mixing/saponification. A significant improvement is noted. The SHRP grade is increased three grades on the high temperature side, 58 to 76 and reduced one grade lower, 34 to 40 on the low side. Comparing asphalts modified by the present invention verses those modified with polymers alone, similar results are obtained with greater economy. Compare, for example, run No. 9 (unmodified) verses run No. 36, modified by the present invention. Run No. 10 (unmodified) verses run No. 37 modified by the present invention can be compared to run No.'s 38 and 39 modified with 3 percent and 3.5 percent SBS. No. 9 has a SHRP grade of 52-28. When No. 9 is modified by the present invention (see No. 36), the SHRP grade increases three on the high side and one on the low side to a SHRP grade of 70-34.

No. 10 has a SHRP grade of 64-22. When modified by the present invention (see No. 37), the SHRP grade increases two grades on the high side and one grade on the low side to 76-28. When No. 10 is modified with SBS at 3 percent or 3.5 percent, but without high shear mixing/saponification, the SHRP grade is 70 and 76 respectively on the high side; however, the low side has decreased to −16 and −10 respectively. The asphalt modified by the present invention and the asphalt modified with SBS (No. 37 verses No.'s 38 and 39) have equal SHRP grading on the high side, however, the SBS modified asphalt (No. 38 and 39) have decreased SHRP grading on the low side.

ELVALOY™ AM modified asphalt, No. 40 also benefited from high shear mixing/saponification by the present invention. No. 40 SHRP graded at 58-34, an increase over the unmodified asphalt No. 3 of 46-34. When asphalt modified with ELVALOY™ AM and saponfication per the present invention was prepared, No. 42, the SHRP grade increased to 70-34. This is four grades higher than No. 3, the unmodified asphalt and two grades higher than No. 40, the ELVALOY™ AM modified asphalt.

The foregoing disclosure and description is illustrative only, and various changes may be made in procedures, materials and compositions, within the scope of the appended claims, without departing from the spirit of the invention.

What is claimed is:

1. An asphalt composition comprising the reaction product of a mixture comprising an asphalt component containing naturally-occurring asphaltic acids and a strong base, said mixture being substantially free of added sources of resin acids and fatty acids, which mixture has been blended with high shear for a sufficient period of time to saponify at least a major portion of said naturally-occurring asphaltic acids.

2. An asphalt composition comprising the reaction product of a mixture comprising an asphalt component containing naturally-occurring asphaltic acids and a strong base, said mixture being substantially free of added sources of resin acids and fatty acids, which mixture has been blended with high shear for at least about 30 minutes, so as to saponify at least a portion of said naturally-occurring asphaltic acids.

3. The asphalt composition in accordance with either claim 1 or 2, wherein said mixture is substantially anhydrous.

4. The asphalt composition according to either claim 1 or 2, wherein said strong base is anhydrous sodium hydroxide.

5. The asphalt composition according to either claim 1 or 2, wherein said asphalt component comprises from about 95 percent to about 99.75 percent, by weight, of said mixture and said strong base comprises from about 0.25 percent to about 5 percent, by weight, of said mixture.

6. The asphalt composition according to either claim 1 or 2 and comprising additionally a polymer selected from the group consisting of styrene butadiene styrene, styrene butadiene rubber, ethylene vinyl acetate, and gilsonite.

7. The asphalt composition according to either claim 1 or claim 2 comprising additionally a polymer modifier comprising co-polymers containing glycidyl methacrylate or glycidyl acrylate as epoxy-bearing moieties.

8. The asphalt composition according to claim 7 wherein said polymer modifier comprises from about 0.25 percent to about 7 percent, by weight, of said asphalt composition.

9. A method for preparing an asphalt composition comprising (1) forming an admixture comprising an asphalt component containing naturally-occurring asphaltic acids and a strong base, said admixture being substantially free of added sources of resin acids and fatty acids, and (2) blending said admixture with high shear for a sufficient period of time to saponify at least a major portion of said naturally-occurring asphaltic acids.

10. A method for preparing an asphalt composition comprising (1) forming and admixture comprising an asphaltic component containing naturally-occurring asphaltic acids and a strong base, said mixture being substantially free of added sources of resin acids and fatty acids, and (2) blending said admixture with high shear for at least about 30 minutes, whereby at least a portion of said naturally-occurring asphaltic acids is saponified by said strong base.

11. The method according to either claim 9 or 10 wherein said step of blending with high shear is conducted at a temperature of from about 135° C. to about 232° C.

12. The method according to either claim 9 or 10 wherein said step of blending with high shear is conducted at a temperature of from about 190° C. to about 218° C.

13. The method according to either claim 9 or 10 wherein said step of blending with high shear is conducted at a temperature of about 204° C.

14. The method according to either claim 9 or 10 wherein said step of blending with high shear is performed for a period of time of from about 30 minutes to 120 minutes.

15. The method according to either claim 9 or 10 wherein said admixture is substantially anhydrous.

16. The method according to either claim 9 or 10 comprising additionally the step of adding a polymer modifier to said admixture prior to blending said composition at high shear.

17. The method according to either claim 9 or 10 wherein said asphalt component of said admixture contains from about 1 to about 12 weight percent, based on the weight of said asphalt component, of naturally-occurring asphaltic acids.

18. The method according to either claim 9 or 10 wherein said strong base is sodium hydroxide.

\* \* \* \* \*